United States Patent [19]

Yang

[11] Patent Number: 5,245,442
[45] Date of Patent: Sep. 14, 1993

[54] MULTI-FUNCTIONAL LASER PRINTER

[75] Inventor: Keun Y. Yang, Seoul, Rep. of Korea

[73] Assignee: Goldstar Co., Ltd., Seoul, Rep. of Korea

[21] Appl. No.: 614,210

[22] Filed: Nov. 15, 1990

[30] Foreign Application Priority Data

Nov. 17, 1989 [KR] Rep. of Korea ............ 16718/1989

[51] Int. Cl.$^5$ ..................... H04N 1/27; B41J 2/47; G02B 5/32
[52] U.S. Cl. .................... 358/300; 346/108; 359/18
[58] Field of Search ........... 358/296, 300, 298, 302, 358/481, 494; 359/17, 18, 216

[56] References Cited

U.S. PATENT DOCUMENTS

| | | | |
|---|---|---|---|
| 4,130,841 | 12/1978 | Walsh | 358/298 |
| 4,266,251 | 5/1981 | Hara et al. | |
| 4,320,955 | 3/1982 | Kay | 358/300 |
| 4,333,006 | 6/1982 | Gorin | 359/18 |
| 4,424,534 | 1/1984 | Nagane | |
| 4,450,485 | 5/1984 | Oshikoshi | 358/302 |
| 4,478,480 | 10/1984 | Doggett | 359/18 |
| 4,586,089 | 4/1986 | Nakazato | 358/481 |
| 4,622,594 | 11/1986 | Honjo et al. | |
| 4,678,263 | 7/1987 | Funato | 359/18 |
| 4,841,147 | 6/1989 | Saotome | 358/302 |
| 4,866,536 | 9/1989 | Honjo et al. | |

FOREIGN PATENT DOCUMENTS 0028845 11/1980 European Pat. Off.
0307845 9/1988 European Pat. Off.
2564992 5/2984 France.

OTHER PUBLICATIONS

Xerox Disclosure Journal, vol. 1, No. 4, Apr. 1976, pp. 37–38.
Japanese Patent Abstract, vol. 8, No. 78, Apr. 10, 1984.
Japanese Patent Abstract, vol. 8, No. 242, Nov. 7, 1984.
Japanese Patent Abstract, vol. 7, No. 164, Jul. 19, 1983.

Primary Examiner—Edward L. Coles, Sr.
Assistant Examiner—Scott Rogers
Attorney, Agent, or Firm—Rosen, Dainow & Jacobs

[57] ABSTRACT

A multi-functional laser printer capable of executing both the printing operation and the manuscript readout operation with one unit. The laser printer comprises a printing unit for splitting a laser beam generated from a laser into a picture forming beam and a manuscript reading-out beam by a beam splitter, and a manuscript readout unit for reading out the content of the manuscript by scanning the manuscript reading-out beam on the manuscript. The printing unit and the manuscript readout unit commony have a double-structured hologram disk for diffracting and scanning the splitted beams. The double-structured hologram disk comprises picture forming holograms formed on the outer peripheral surface thereof and manuscript reading-out holograms formed on the interior thereof.

18 Claims, 7 Drawing Sheets

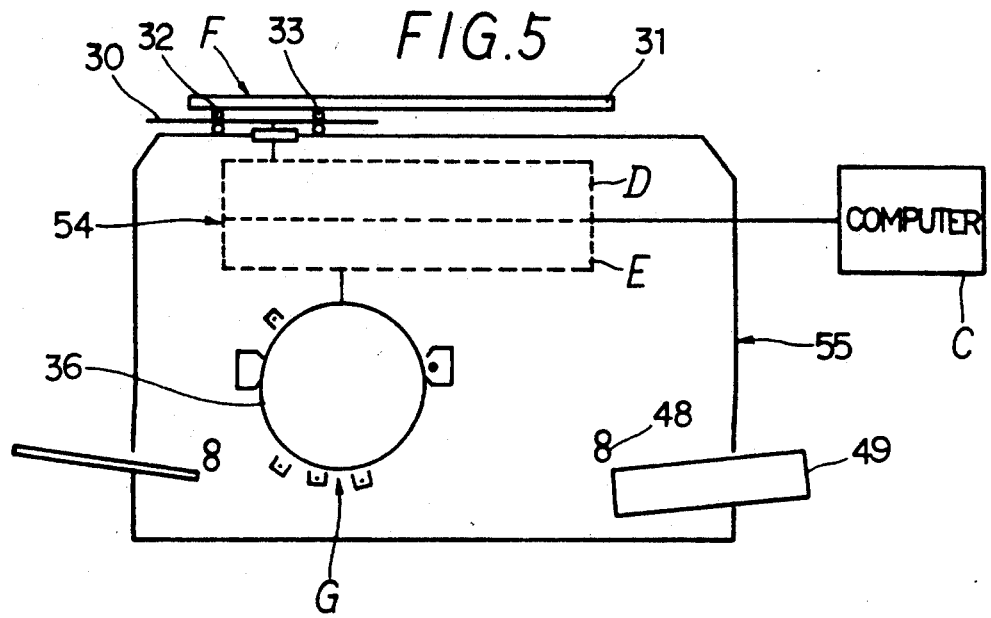
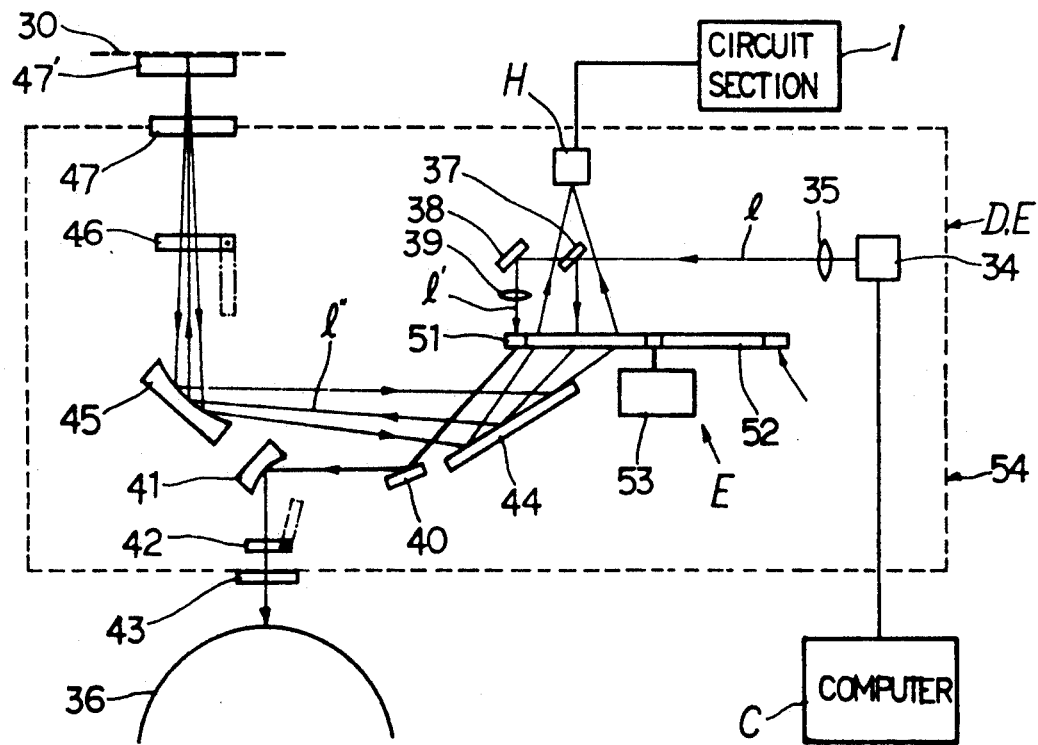

$f = \dfrac{L7\,L8}{L7+L8}$

MULTI-FUNCTIONAL LASER PRINTER

BACKGROUND OF THE INVENTION

The present invention relates to a multi-functional laser printer using a double-structured hologram disk, and more particularly to a multi-functional laser printer which is capable of performing a function of forming a picture on a photosensitive drum as well as a manuscript reading-out function.

Generally used laser printer is structured with a laser beam scanning unit, a computer for controlling the laser beam scanning unit so as a laser beam to be outputted according to the information to be printed, and a printing unit for forming a picture on a photosensitive drum and executing a printing operation in accordance with the laser beam being applied from the laser beam scanning unit thereto.

A typical type of such a conventional laser printer is illustrated in FIGS. 1 and 2.

In FIGS. 1 and 2, reference numeral 1 denotes a laser beam scanning unit, 10 is a printing unit, and 23 is a computer. The laser beam scanning unit 1 comprises a laser 2 which generates a laser beam (l), a collimator 3 which changes the laser beam (l) into a parallel light, a cylindrical lens 4 which concentrates the parallel light from the collimator 3 toward a rotary polyhedric mirror 5, compensating lenses 7 and 8 which compensate the laser beam reflected from the rotary polyhedric mirror 5 so as to be formed as a picture accurately on a photosensitive drum 11, and a reflective mirror 9 which deflects the laser beam from the compensating lenses 7 and 8 toward the photosensitive drum 11.

The rotary polyhedric mirror 5 is driven by a drive motor 6, and each of the compensating lenses 7 and 8 has at least one toric surface on one side surface thereof.

The printing unit 10 comprises a photosensitive drum 11 on which the laser beam from the laser beam scanning unit 1 is formed as a picture, an electrifier 12, a developer 13, a transfer printer 14, a separator 15, an electricity remover 16, a fixing heater 17, a cleaner 18, and means for feeding, conveying and discharging papers. Said means for feeding, conveying and discharging papers comprises a cassette 19, paper feeding rollers 20, paper discharging rollers 21, and a paper discharging tray 22.

In such a conventional laser printer, the laser 2 emits a laser beam 1 while being turned on or off in response to the picture signal received from the computer 23, and the emitted laser beam (l) is converted into a parallel light by the collimator 3 and then converged on the mirror surface of the rotary polyhedric mirror 5 by the cylindrical lens 4.

The laser beam (l) converged to said rotary polyhedric mirror 5 is reflected at various angles according as said rotary polyhedric mirror 5 is rotated by the driving force of the drive motor 6, and deflected by the reflective mirror 9 after passing through the compensating lenses 7 and 8 and then converged on the photosensitive drum 11.

The compensating lenses 7 and 8 compensate the focal locus of the laser beam (l) from a curved line to a straight line when the laser beam (l) is converged and scanned on the photosensitive drum 11 and also compensate the laser beam (l) being moved slightly perpendicular to the scanning plane due to an inclination of the mirror surface of the rotary polyhedric mirror 5 or a vibration of the mirror surface when the rotary polyhedric mirror 5 turns.

After the laser beam (l) is thus focused on the photosensitive drum 11, the printing operation is executed by the well known general printing process.

However, such a conventional laser print is merely capable of performing a simple operation for forming a picture on a photosensitive drum. Moreover, since the compensating lenses require at least one toric surface on one surface thereof in order to compensate the focal locus from a curved line into a straight line the laser beam must be moved slightly in the direction perpendicular to the scanning surface. As a result, in the increase of cost.

SUMMARY OF THE INVENTION

Therefore, an object of the present invention is to provide a multi-functional laser printer which can execute the operation of forming a picture on a photosensitive drum to print as well as a manuscript reading-out function with one unit by using a double-structured hologram disk.

Another object of the present invention is to provide a multi-functional laser printer which uses reflective mirror and concave reflective mirror as a laser beam compensating means.

To accomplish the above objects, the laser printer according to the present invention comprises a printing means for forming a picture and executing a printing operation by splitting a laser beam from a laser into a first laser beam for forming a picture and a second laser beam for reading out a manuscript upon the control of a computer and then scanning the first laser beam on a photosensitive drum, and a manuscript readout photosensitive drum, and a manuscript readout means for reading out the content of a manuscript by scanning the second laser beam on a manuscript to reflect therefrom and detect thereof. The printing means and manuscript readout means commonly have a laser for generating a laser beam, and a beam splitter for splitting a laser beam from the laser into a first laser beam for picture forming and a second laser beam for manuscript reading.

The picture forming optical unit of the printing means an the manuscript reading-out optical unit commonly have a double-structured hologram disk which diffracts and scans the first and second laser beams and a compensating means which compensates a laser beam diffracted from and scanned by the double-structured hologram disk, wherein a concave reflective mirror is used as the compensating means.

By these arrangements, the present invention executes the printing operation as well as the manuscript reading-out operation with one unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a schematic longitudinal sectional view showing the configuration of the laser printer according to the present invention;

FIG. 6 is an elevational view showing the configuration of an optical unit of FIG. 3;

DETAILED DESCRIPTION OF THE INVENTION

Figure 1:
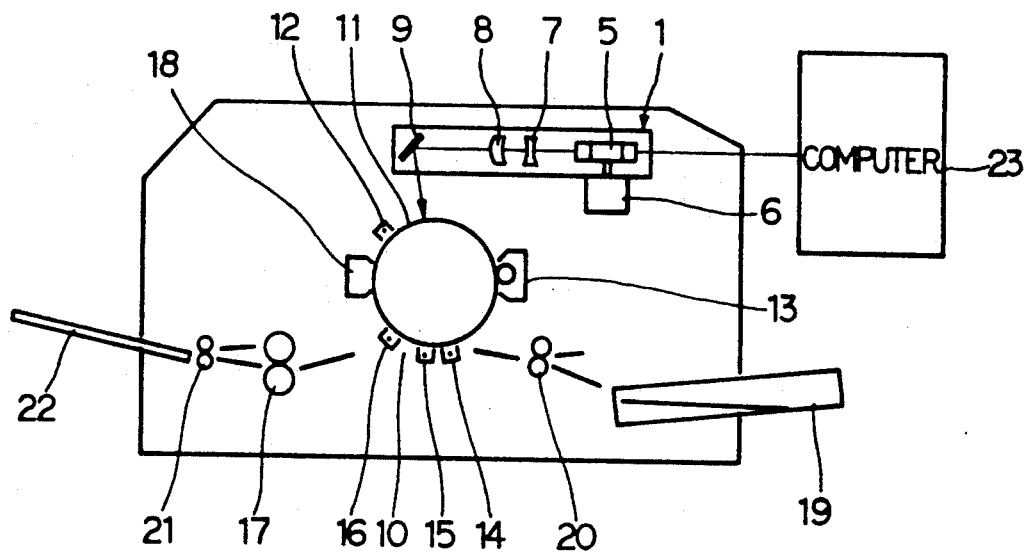
FIG. 1 is a schematic longitudinal sectional view showing the configuration of a conventional laser printer.
Figure 2:
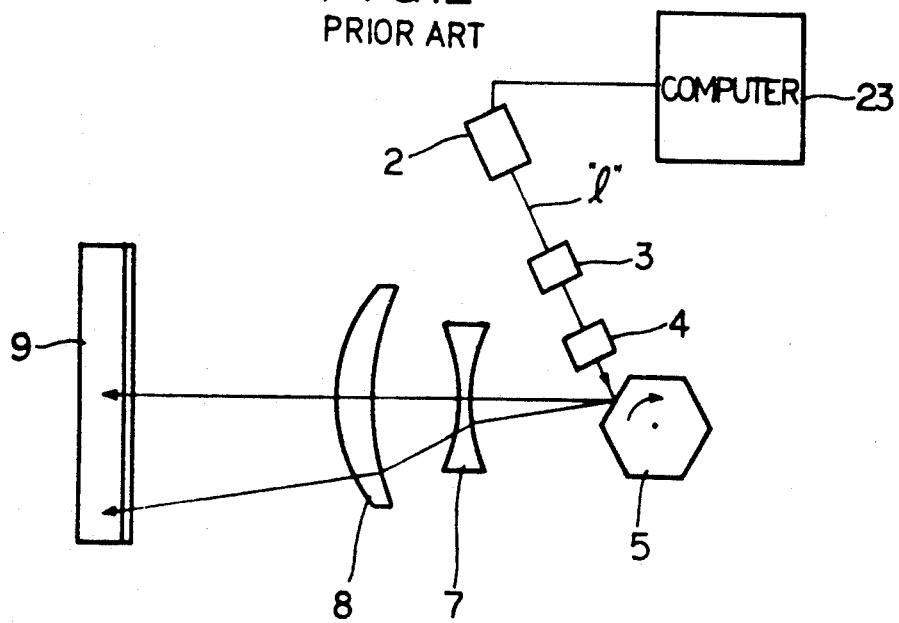
FIG. 2 is a plane view showing a laser beam scanning unit of the conventional laser printer.
Figure 3A:
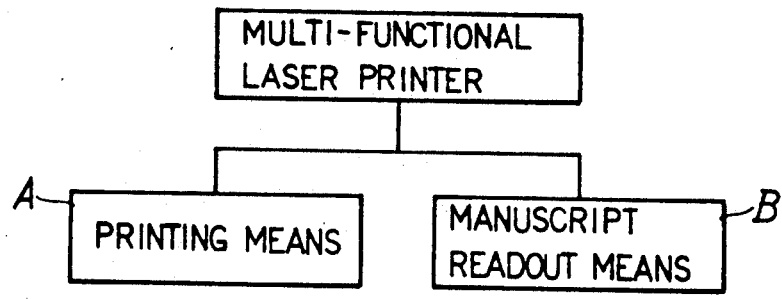
FIGS. 3A to 3C are systematic views of a laser printer according to the present invention.
Figure 3B:
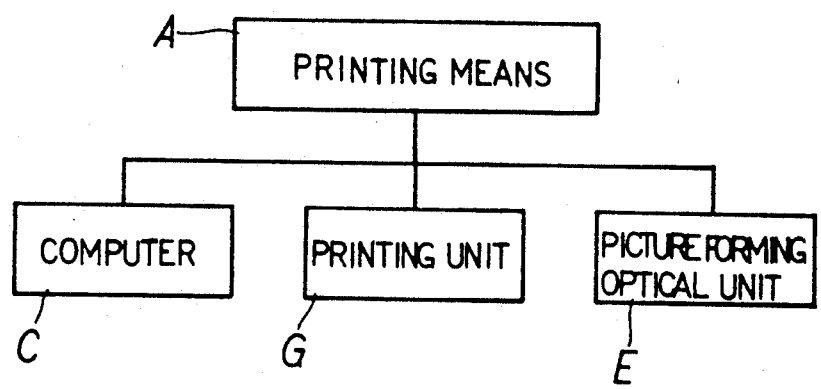
Figure 3C:
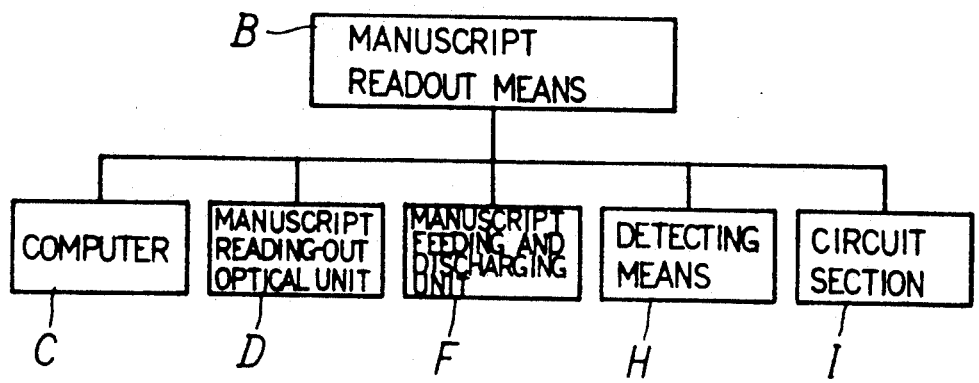
Figure 4A:
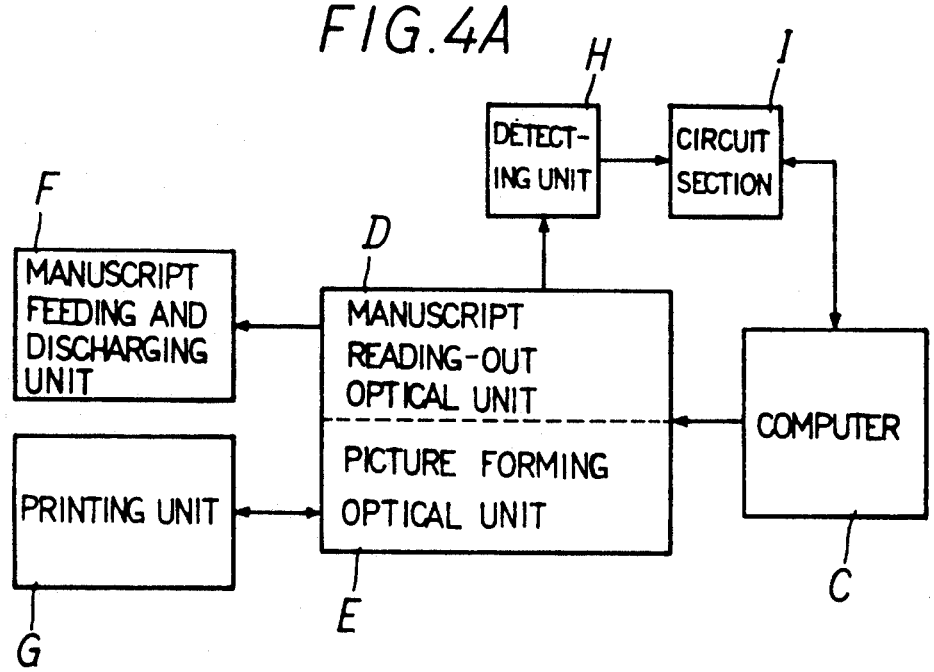
FIGS. 4A and 4B are block diagrams of the laser printer of the present invention.
Figure 4B:
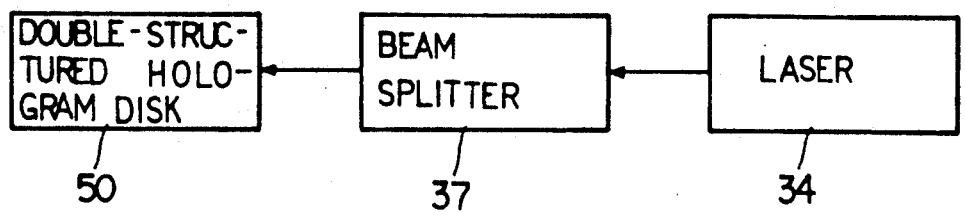

Referring to FIGS. 3 and 4, the multi-functional laser printer of the present invention generally comprises a printing means (A) and a manuscript readout means (B). The printing means (A) comprises a computer (C) for controlling the whole operation of system, a printing unit (G) and a picture forming optical unit (E), and the manuscript readout means (B) comprises a computer (C) for controlling the whole operation of system, a manuscript reading-out optical unit (D), a manuscript feeding and discharging unit (F), a detecting unit (H), and a circuit section (I).

Referring to FIGS. 3 to 6, the multi-functional laser printer of the present invention comprises a printing means (A), which splits a laser beam (R) generated from a laser 34 upon the control of the computer (C) into a first laser beam (l') for forming a picture and a second laser beam (l") for reading out the content of manuscript and scans the first laser beam (l') to a photosensitive drum 34 to form a picture thereon and then executing the printing operation, and a manuscript readout means (B) which scans the second laser beam (l") to a manuscript 30 and reads out the content of the manuscript 30 by detecting the second laser beam (l") reflected from the manuscript 30.

The printing means (A) and the manuscript readout means (B) commonly have a laser 34 which generates a laser beam (l), and a beam splitter 37 which splits the laser beam (l) from the laser 34 into first laser beam (l') and second laser beam (l") so that the printing operation and manuscript reading-out operation can be executed with one laser 34.

The printing means (A) and the manuscript readout means (B) commonly have a double-structured hologram disk which diffracts and scans the first and second laser beams (l') and (l") splitted by the beam splitter 37. The printing means (A) comprises a picture forming optical unit (E) which forms a picture on the photosensitive drum 36 with the first laser beam (l') and a printing unit (G) which prints a picture formed on the photosensitive drum 36. The manuscript readout means (B) comprises a manuscript reading-out optical unit (D) which reads out the content of a manuscript 30 with the second laser beam (l"), a circuit section (I) for storing the content of manuscript that has been read, which is under the control of the computer (C), and a manuscript feeding and discharging unit (F) which feeds and discharges the manuscript 30.

The picture forming optical unit (E) is constituted in a manner that a focusing lens 35 is provided between the laser 34 and the beam splitter 37, a focusing lens 39 is provided between the beam splitter 37 and the double-structured hologram disk 50, a compensating means 41 for compensating the bending of scanning line is provided between the double-structured hologram disk 50 and the photosensitive drum 36, on a light path of the first laser beam (l') a shutter for opening or closing the light path and reflective mirrors 38 and 40 for changing the light path are provided, and a window 43 is fixed to an optical unit casing 54 so that the first laser beam (l') is scanned on the photosensitive drum 36 therethrough.

The manuscript reading-out optical unit (D) is constituted in a manner that the focusing lens 35 is provided between the laser 34 and the beam splitter 37, a compensating means 45 for compensating the bending of scanning line is provided between the double-structured hologram disk 50 and a manuscript 30, on a light path of the second laser beam (l") a shutter 46 for opening or closing the light path and a reflective mirror 44 for changing the light path are provided, and between the double-structured hologram disk 50 and the circuit section (I) a detecting means (H) for detecting and transferring the second laser beam (l") that has passed through the compensating means 45 and the double-structured hologram disk 50, to the circuit section (I) is provided.

The double-structured hologram disk 50 has a picture forming hologram 51 for diffracting the first laser beam (l') at the outer peripheral surface thereof and a manuscript reading-out hologram 52 for diffracting the second laser beam (l") at the inner side thereof. The hologram disk 50 having such a configuration is rotated by the drive motor 53.

As for the compensating means 41 and 45, concave reflective mirrors are used.

The manuscript feeding and discharging unit (F) comprises feeding rollers 33 for transferring a manuscript 30 over the window 47', discharging rollers 33 for discharging the manuscript 30, and a manuscript cover 31.

As for the printing unit (G), detailed explanation will be omitted as the structure is the same as the conventional one as explained above.

In FIG. 5, reference numeral 48 represents paper feeding rollers, and 49 is a paper feeding cassette.

Figure 7:
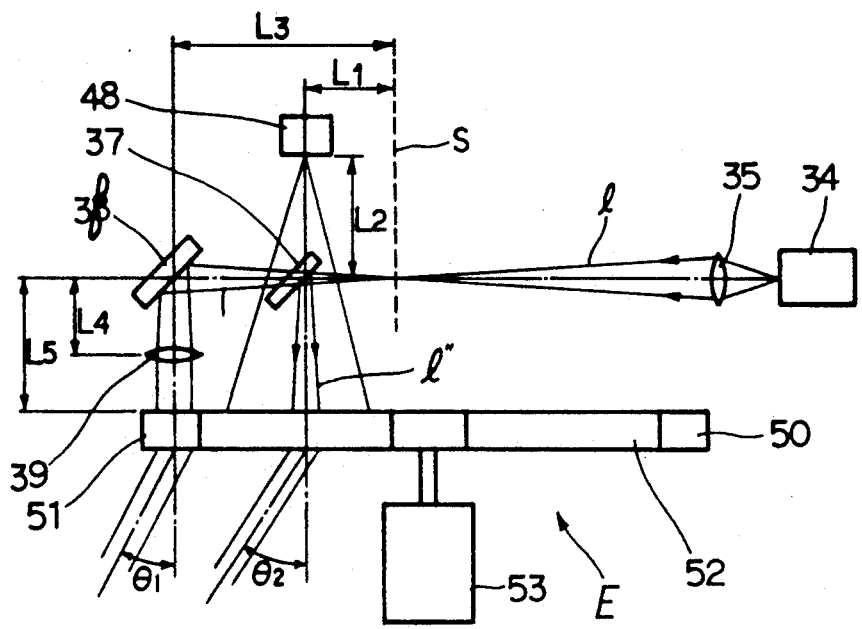
FIG. 7 is an enlarged view showing the major parts of the laser printer of the present invention.

And, in constituting the multi-functional laser printer of the present invention, as shown in FIG. 7, the focusing lens 39 is mounted at the position where the focus of the focusing lens 39 is same as the sum of a distance $L_3$ between the reflective mirror 38 and the focusing surface (S) where a laser beam is focused by the front focusing lens 35 and a distance $L_4$ between the reflective mirror 38 and the focusing lens 39 so that the focusing lens 39 changes the laser beam diverged from the focusing surface (S) into a parallel light.

The distance between the double-structured hologram disk 50 and concave reflective mirrors 41 and 45, and the distance between the manuscript 30 and the photosensitive drum 36 are determined by the following principle.

Figure 12A:
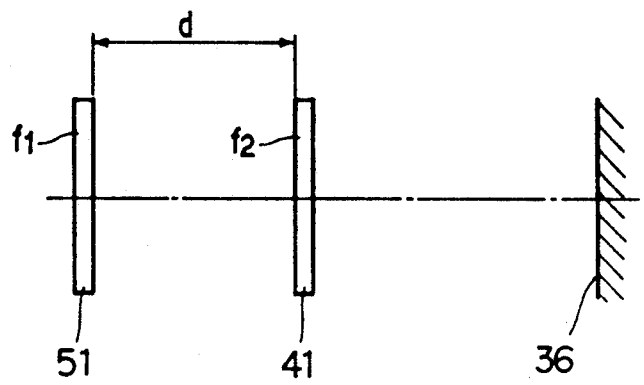
FIGS. 12A and 12B are explanatory views illustrating the distance relations between the hologram disk, concave reflective mirrors, and manuscript surface and photosensitive drum.
Figure 12B:
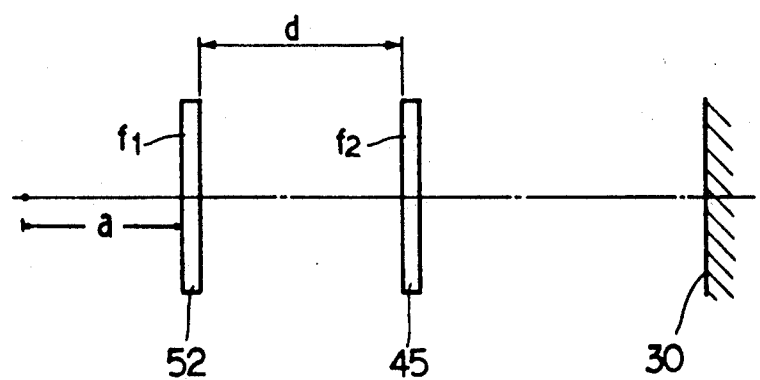

That is, as shown in FIG. 12A, assuming that the focus of the hologram 51 for picture formation of the hologram disk is $f_1$, the focus of the concave reflective mirror 41 is $f_2$, and the distance between the hologram 51 and the concave reflective mirror 41 is d, the distance between the concave reflective mirror 41 and the photosensitive drum 36 has a value of $(f_1 \cdot f_2 - f_2 \cdot d)$ so that the laser beam is focused on the photosensitive drum, and as shown in FIG. 12B, assuming that the focus of the hologram 52 for reading out the manuscript is $f_1$, the focus of the concave reflective mirror 45 is $f_2$, the distance between the hologram 52 and the concave reflective mirror 45 is d, and the distance $(L_1+L_5)$ from the focusing surface (S) where the laser beam (l) is focused by the front focusing lens 35 to the double-structured hologram disk 50 via the beam splitter 37 is a, the distance between the concave reflective mirror 45 and the manuscript 30 has a value of $(f_2 \cdot a \cdot d - d \cdot f_1 \cdot f_2 - a \cdot f_1 \cdot f_2)/(da - d \cdot f_1 - af_1 - af_2 + f_1 \cdot f_2)$ so that the laser beam is focused on the manuscript.

Figure 8:
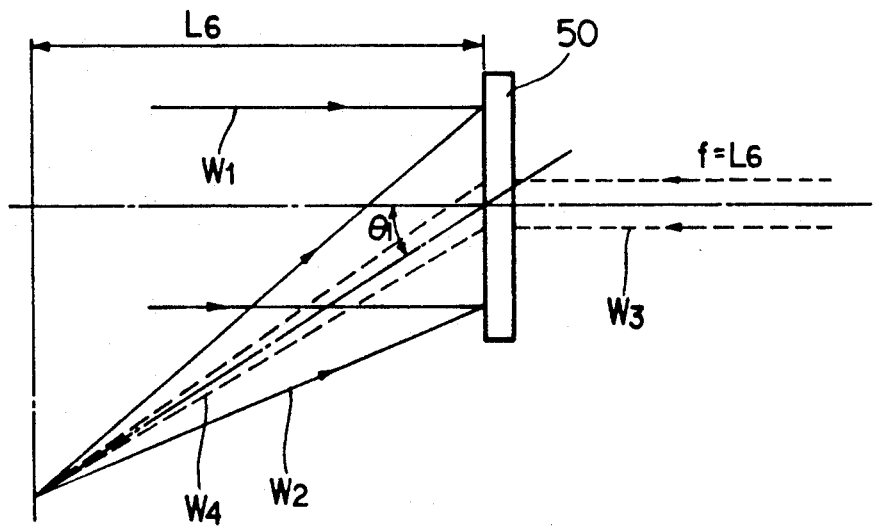
FIGS. 8 and 9 are explanatory views illustrating the manufacturing process of a double-structured hologram disk including two types of holograms, the one being a picture forming hologram and the other being a manuscript reading-out hologram.

In addition, the hologram 51 for forming a picture is built in such that plane wave $W_1$ and diverging spherical wave $W_2$ are incident upon the double-structured hologram disk 50 with an angle of $\theta_1$ therebetween, as shown in FIG. 8. Where, the distance $L_6$ from the diverging position of the diverging spherical wave $W_2$ to the double-structured hologram disk 50 is same as the focus fl used in the expression $(f_1 \cdot f_2 - f_2 \cdot d)/(f_1 + f_2 - d)$ as in FIG. 12A.

Figure 9:
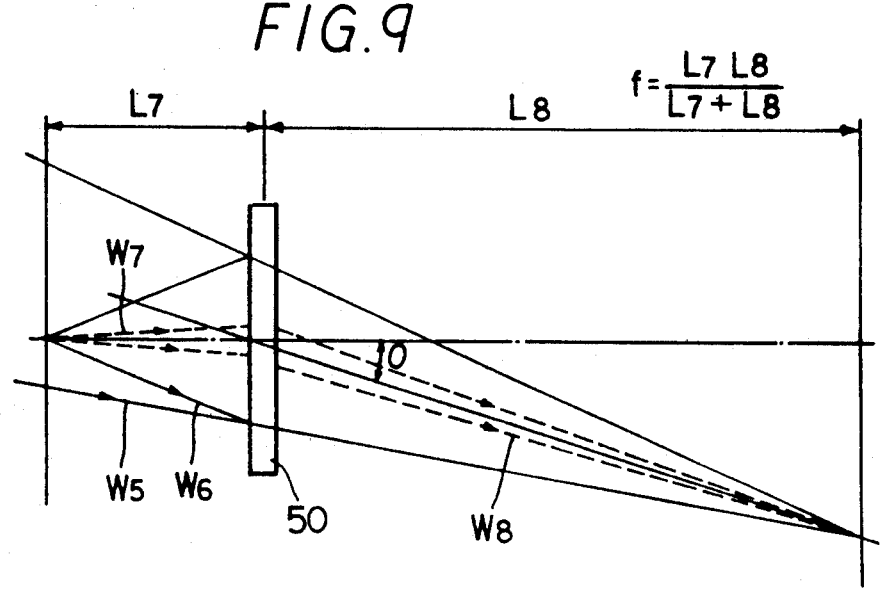

The hologram 52 for reading out a manuscript is built in such that diverging spherical wave $W_6$ and converging spherical wave $W_5$ are incident upon the double-structured disk 50 with an angle of $\theta_2$ therebetween, as shown in FIG. 9. Where, the diverging distance $(L_7)$ of the diverging spherical wave $W_6$ is same as the distance $(L_1+L_5)$ from the focusing surface (F) on which the laser beam is focused to the double-structured hologram disk 50, as shown in FIG. 7, and the diverging distance $(L_8)$ of the diverging spherical wave $(W_5)$ has a value calculated from the focus (f) of the double-structured hologram disk 50, that is, $f=L_7 \cdot L_8/L_7 L_8$, which is used in the expression of $$\frac{(f_2 \cdot a \cdot d - d \cdot f_1 \cdot f_2 - af_1 \cdot f_2)}{(d \cdot a - d \cdot f_1 - a \cdot f_1 - af_2 + f_1 f_2)},$$

as in FIG. 12.

As for the detecting means (H), a photodetector is used. The detecting means (H) is positioned such that the distance $(L_2)$ between the detecting means (H) and the beam splitter 37 is same as the distance $(L_1)$ between the laser beam focusing surface (s) and the beam splitter 37.

In FIGS. 8 and 9, $W_3$ shows a beam for reconstruction (plane wave), $W_4$ shows a reconstructed beam (converging spherical wave, $W_6$ shows a beam for reconstruction (diverging spherical wave), $W_7$ shows a reconstructed beam (converging spherical wave), $L_7$ is a distance from the diverging position of the diverging spherical wave $(W_6)$ to the double-structured hologram disk 50, $L_8$ is a distance from the converging position of the converging spherical wave $(W_5)$ to the double-structured hologram disk 50, $\theta_1$ is a diffraction angle of the picture forming hologram 52, and $\theta_2$ is a diffraction angle of the manuscript reading-out hologram 52.

The multi-functional laser printer according to the present invention is capable of performing both the picture forming function and the manuscript reading-out function.

Figure 10:
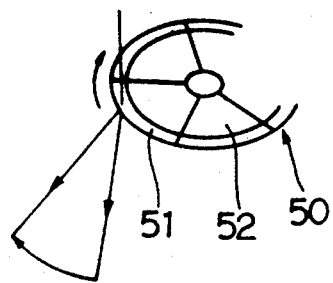
FIG. 10 is an explanatory view illustrating the bending of scanning line in response to the rotation of the hologram disk.
Figure 11:
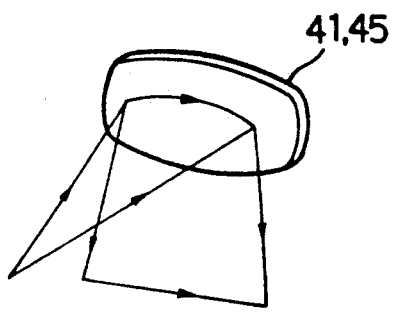
FIG. 11 is an explanatory view illustrating the compensation of the bending of scanning line by a concave reflective mirror.

Explaining first the picture forming function, a laser beam (l) from a laser 34 is focused by a focusing lens 35, and diverged again while passing through the laser beam focusing surface (S). The laser beam (l) thus diverged is splitted into two laser beams, i.e., a first laser beam (l') and a second laser beam (l'') by the beam splitter 37. One of the two laser beams is reflected by a reflective mirror 38 and changed to a parallel beam by a focusing lens 39 and then vertically directed to the picture forming hologram 51 of the double-structured hologram disk 50. The incident laser beam (l) is diffracted and scanned like line 1 of FIG. 10 according as the double-structured hologram disk 50 is rotated by the driving force of a drive motor 53, and then directed toward a concave reflective mirror 41 by a reflective mirror 40. The scanning line at this time has a bending. This bent scanning line is compensated like line 2 by the concave reflective mirror 41 as shown in FIG. 11, and then scanned on the photosensitive drum 36 after passing through a shutter 42 and a window 43. And when the first laser beam (l') is scanned on the photosensitive drum 36, the laser 34 is turned on or off depending upon the picture signal from a computer (C) so that a picture is formed on a photosensitive drum 36.

Next, explaining the manuscript reading-out function, the second laser beam (l'') splitted by the beam splitter 37 is incident vertically upon the manuscript reading hologram 52 of the double-structured hologram disk 50 and then scans a manuscript 30 in a same manner as above. At this time, the second laser beam (l'') dispersed from the manuscript 30 is reflected again and focused by the detecting means (H) through the manuscript reading hologram 52. The intensity of the laser beam being incident upon the detecting means (H) differs depending upon the brightness of the manuscript 30. That is, since the black portion, where a picture exists, absorbs the laser beam in large and the white portion, where a picture does not exist, absorbs the laser beam little, the intensity of laser beam differs depending upon the picture. Thus, when the detecting means (H) detects signals, a circuit section (I) amplifies, analyses and stores the detected signals, thereby reading out the manuscript.

In executing such operations, the lower shutter 42 is opened and the upper shutter 46 is closed at the time of a picture forming function, while the lower shutter 42 is closed and the upper shutter 46 is opened when reading out a manuscript.

And, after the first laser beam (l) is formed on the photosensitive drum 36, the printing operation is carried out in accordance with the conventional printing procedure.

As described above in detail, the present invention has the effects that the picture forming function and the manuscript reading-out function are carried out with one unit and that the optical system is structured with inexpensive parts such as hologram disk, concave reflective mirrors, and the like, resulting in the cost down.

What is claimed is:

1. A multi-functional printer, comprising:
   a printing means having a means for splitting a laser beam generated from a laser into a first laser beam for picture formation and a second laser beam for reading-out a manuscript, and means for scanning said first laser beam on a photosensitive drum to form a picture and execute a printing operation; and a manuscript readout means for reading out the content of the manuscript, said manuscript readout means comprising;

means for scanning said second laser beam onto said manuscript to provide a reflector beam, means for detecting said reflected beam; and means of scanning said reflected beam onto said detecting means;

said printing means and manuscript readout means comprise in common a rotatable disk, said means for scanning said first laser beam comprising a first hologram on said rotatable disk, and said means for scanning said second laser beam comprising a second hologram different from said first hologram on said rotatable disk.

2. The multi-functional laser printer of claim 1, wherein said printing means comprises a laser for generating a laser beam;

said means for splitting includes a beam splitter for splitting the laser beam generated from the laser into a first laser beam for forming a picture and a second laser beam for reading out a manuscript;

a picture forming optical unit including a rotatable disk having a first and second hologram for diffracting and scanning said first and second laser beams, and for forming a picture on a photosensitive drum with said first laser beam;

a printing unit for printing the picture formed on the photosensitive drum; and a computer for controlling said laser.

3. The multi-functional laser picture of claim 1, wherein said manuscript readout means comprises a laser for generating a laser beam;

a beam splitter for splitting the laser beam generated from the laser into a first laser beam for forming a picture and a second laser beam for reading out a manuscript;

a manuscript reading out optical unit including said rotatable disk for diffracting and scanning the first and second laser beams, respectively, and for reading out a manuscript with said second laser beam;

a circuit section connected with a computer for storing the content of the manuscript; and a manuscript feeding and discharging unit for feeding and discharging a manuscript.

4. The multi-functional laser printer of claim 2, wherein said picture forming optical unit comprises:

a first focusing lens provided between the laser and the beam splitter;

a second focusing lens provided between the beam splitter and the disk;

a compensating means for compensating the bending of scanning line provided between the disk and the photosensitive drum;

a shutter for opening or closing the path of the first laser beam provided on the path of the first laser beam; and a plurality of reflective mirrors for changing the light path provided on the light path of the first laser beam.

5. The multi-functional laser printer of claim 3, wherein said manuscript reading-out optical unit comprises:

said first focusing lens provided between the laser and the beam splitter;

a compensating means for compensating the bending of scanning line provided between the disk and a manuscript;

a shutter for opening or closing the path of the second laser beam provided on the light path of the second laser beam;

a plurality of laser beams for changing the light path provided on the second laser beam; and a detector for detecting the second laser beam which has passed through the compensating means and the disk after being reflected from the manuscript and for transferring the second laser beam to the circuit section.

6. The multi-functional laser printer of claim 2, wherein said disk has a configuration that picture forming holograms for diffracting the first laser beam are formed on the outer peripheral surface thereof and manuscript reading-out holograms for diffracting the second laser beam are formed on the interior thereof, and said disk is driven by a drive motor.

7. The multi-functional laser printer of claim 4 or 5, wherein said compensating means is a concave reflective mirror.

8. The multi-functional laser printer of claim 4 or 5, wherein said shutters of the picture forming optical unit and the manuscript reading-out optical unit are oppositely operated in their opening and closing.

9. The multi-functional laser printer of claim 3, wherein said manuscript feeding and discharging unit comprises;

a window providing on the upper surface of the main body;

feeding and discharging rollers for feeding and discharging a manuscript over the window; and a manuscript cover provided on the upper portion of the main body to function in an opening and closing manner.

10. The invention according to claim 1, wherein said means for detecting comprises a detector and means for passing said reflected beam on said detector via said second hologram.

11. A multi-functional printer, comprising a printing means having a means for splitting a laser beam generated from a laser into a first laser beam for picture formation and a second laser beam for reading-out a manuscript, and means for scanning said first laser beam on a photosensitive drum to form a picture and execute a printing operation; and a manuscript readout means for reading out the content of the manuscript, said manuscript readout means comprising means for scanning said second laser beam into the manuscript to provide a reflected beam, means for detecting said reflected beam, and means for scanning said reflected beam into said detecting means, said printing means comprises a laser for generating a laser beam, said means for splitting includes a beam splitter for splitting the laser beam generated from the laser into a first laser beam for forming a picture and a second laser beam for reading out a manuscript;

a picture forming optical unit including a rotatable disk having a first hologram and second hologram different than said first hologram for diffracting and scanning the first and second laser beams, respectively, and for forming a picture on a photosensitive drum with said first laser beam;

a printing unit for printing the picture formed on the photosensitive drum;

and a computer for controlling the laser, said picture forming optical unit comprises:

first focusing lens provided between the laser and the beam splitter;

a second focusing lens provided between the beam splitter and the disk;

a compensating means for compensating the bending of scanning line provided between the disk and the photosensitive drum;

a shutter for opening or closing the path of the first laser beam provided on the path of the first laser beam;

a plurality of reflective mirrors for changing the light path provided on the light path of the first laser beam.

12. The multi-functional laser printer of claim 11, wherein said disk has a configuration that picture forming holograms for diffracting the first laser beam are formed on the outer peripheral surface thereof and manuscript reading-out holograms for diffracting the second laser beam are formed on the interior thereof, and said disk is driven by a drive motor.

13. A multi-functional printer, comprising:

a printing means having a means for splitting a laser beam generated from a laser into a first laser beam for picture formation and a second laser beam for reading-out a manuscript, and means for scanning said first laser beam on a photosensitive drum to for a picture and execute a printing operation; and a manuscript readout means for reading out the content of the manuscript, said manuscript readout means comprising means for scanning said second laser beam into the manuscript to provide a reflected beam, means for detecting said reflected beam, and means for scanning said reflected beam into said detecting means, said manuscript readout means comprises:

a laser for generating a laser beam;

a beam splitter for splitting the laser beam generated from the laser into a first laser beam for forming a picture and a second laser beam for reading out a manuscript;

a manuscript reading-out optical unit including a rotatable disk having a first hologram and a second hologram different than said first hologram for diffracting and scanning the first and second laser beam, respectively, and for reading out a manuscript with said second laser beam;

a circuit section connected with a computer for storing the content of the manuscript; and a manuscript feeding and discharging unit for feeding and discharging a manuscript, said manuscript reading-out optical unit comprises:

said first focusing lens provided between the laser and the beam splitter;

a compensating means for compensating the bending of scanning line provided between the disk and a manuscript;

a shutter for opening or closing the path of the second laser beam provided on the light path of the second laser beam;

a plurality of laser beams for changing the light path provided on the second laser beam;

and a detector for detecting the second laser beam which has passed through the compensating means and the disk after being reflected from the manuscript and for transferring the second laser beam to the circuit section.

14. The multi-functional laser printer of claim 11 or claim 13, wherein said compensating means is a concave reflective mirror.

15. The multi-functional laser printer of claim 11 or claim 13, wherein said shutters of the picture forming optical unit and the manuscript reading-out optical unit are oppositely operated in their opening and closing.

16. A multi-functional printer, comprising:

a printing means having a means for splitting a laser beam generated from a laser into a first laser beam for picture formation and a second laser beam for reading-out a manuscript, and means for scanning said first laser beam on a photosensitive drum to form a picture and execute a printing operation; and a manuscript readout means for reading out the content of the manuscript, said manuscript readout means comprising means for scanning said second laser beam into the manuscript to provide a reflected beam, means for detecting said reflected beam, and means for scanning said reflected beam into said detecting means, said printing means comprises a laser for generating a laser beam;

said means for splitting includes a beam splitter for splitting the laser beam generated from the laser into a first laser beam for forming a picture and a second laser beam for reading out a manuscript;

a picture forming optical unit including a rotatable disk and drive motor having a first hologram and second hologram different from said first hologram for diffracting and scanning the first and second laser beams, and for forming a picture on a photosensitive drum with respectively said first laser beam;

a printing unit for printing the picture formed on the photosensitive drum; and a computer for controlling the laser, wherein said disk has a configuration such that picture forming holograms for diffracting the first laser beam are formed on the outer peripheral surface thereof and manuscript reading-out holograms for diffracting the second laser beam are formed on the interior thereof.

17. A multi-functional printer, comprising:

a printing means having means for splitting a laser beam generated from a laser into a first laser beam for picture formation and a second laser beam for reading-out a manuscript, and means for scanning said first laser beam on a photosensitive drum to form a picture and execute a printing operation; and a manuscript readout means for reading out the content of the manuscript, said manuscript readout means comprising means for scanning said second laser beam into the manuscript to provide a reflected beam, means for detecting said reflected beam, and means for scanning said reflected beam into said detecting means, said printing means comprises a rotatable disk and drive motor having a first hologram and second hologram different from said first hologram for diffracting and scanning the first and second laser beam, respectively, and said manuscript readout comprises said rotatable disk, said disk has a configuration such that picture forming holograms for diffracting the first laser beam are formed on the outer peripheral surface thereof and manuscript reading-out holograms for diffracting the second laser beam are formed on the interior thereof.

18. A multi-functional printer, comprising:

a printing means having a means for splitting a laser beam generated from a laser into a first laser beam for picture formation and a second laser beam for reading-out a manuscript, and means for scanning said first laser beam on a photosensitive drum to form a picture and execute a printing operation; and a manuscript readout means for reading out the content of the manuscript, said manuscript readout means comprising means for scanning said second laser beam into the manuscript to provide a reflected beam, means for detecting said reflected beam, and means for scanning said reflected beam into said detecting means, said manuscript readout means comprises a laser for generating a laser beam;

a beam splitter for splitting the laser beam generated from the laser into a first laser beam for forming a picture and a second laser beam for reading out a manuscript;

a manuscript reading-out optical unit including a rotatable disk and drive motor having a first hologram and second hologram different than said first hologram for diffracting and scanning the first and second laser beam, respectively, and for reading out a manuscript with said second laser beam;

a circuit section connected with a computer for storing the content of the manuscript; and a manuscript feeding and discharging unit for feeding and discharging a manuscript, said disk has a configuration that picture forming holograms for diffracting the first laser beam are formed on the outer peripheral surface thereof and manuscript reading-out holograms for diffracting the second laser beam are formed on the interior thereof.

* * * * *